(12) United States Patent
Kepler et al.

(10) Patent No.: US 8,609,284 B2
(45) Date of Patent: Dec. 17, 2013

(54) COMPOSITE FOR CATHODE OF LI-ION BATTERY, ITS PREPARATION PROCESS AND THE LI-ION BATTERY

(75) Inventors: Keith D. Kepler, Belmont, CA (US); Yu Wang, Foster City, CA (US); Hongjian Liu, Hercules, CA (US); Floris Tsang, Walnut Creek, CA (US)

(73) Assignee: Farasis Energy, Inc., Hayward, CA (US)

( * ) Notice: Subject to any disclaimer, the term of this patent is extended or adjusted under 35 U.S.C. 154(b) by 325 days.

(21) Appl. No.: 12/913,722

(22) Filed: Oct. 27, 2010

(65) Prior Publication Data

US 2011/0123865 A1    May 26, 2011

Related U.S. Application Data

(60) Provisional application No. 61/279,843, filed on Oct. 27, 2009.

(51) Int. Cl.
*H01M 4/13* (2010.01)

(52) U.S. Cl.
USPC .... 429/231.95; 429/223; 429/224; 429/218.1

(58) Field of Classification Search
USPC ............ 429/231.95, 223, 224, 218.1
See application file for complete search history.

(56) References Cited

U.S. PATENT DOCUMENTS

2010/0047691 A1* 2/2010 Kawakami .......... 429/221

FOREIGN PATENT DOCUMENTS

| JP | 04-328258 | * 11/1992 | .......... H01M 4/58 |
| WO | WO 2008/050903 | * 5/2008 | ........ H01M 10/36 |

* cited by examiner

*Primary Examiner* — Helen O Conley
(74) *Attorney, Agent, or Firm* — Blakely, Sokoloff, Taylor & Zafman LLP

(57) ABSTRACT

Disclosed herein is a composite for the cathode of Li-ion battery comprising: a base active material represented by $Li_{1+y}(Ni_a\text{—}Co_b\text{—}Mn_c\text{—}Y_d)O_2$ wherein Y is at least one selected from Mg, Zn, Al, Ga, Cu, B, Zr, and Ti, y is 0 to 0.5, a is 0.1 to 0.6, b is 0.05 to 0.5, c is 0.25 to 0.8, d is 0 to 0.02, and the sum of a, b, c and d is 1; and a coating on the base active material comprised of a glassy phase containing the components $Li_2O$, $B_2O_3$ and LiX in which LiX is at least one of $Li_2F_2$, $Li_2Cl_2$ and $Li_2SO_4$, relative to the total amount of the glassy phase, the mole percent of $Li_2O$ is 43% to 75%, the mole percent of $B_2O_3$ is 25% to 57%, the mole percent of LiX is from more than 0% to 20%, and the sum of the mole percents of $Li_2O$, $B_2O_3$ and LiX is 100%.

10 Claims, 7 Drawing Sheets

COMPOSITE FOR CATHODE OF LI-ION BATTERY, ITS PREPARATION PROCESS AND THE LI-ION BATTERY

CROSS-REFERENCE TO RELATED APPLICATIONS

The present non-provisional application claims the benefits of the provisional application Ser. No. U.S. 61/279,843 filed on Oct. 27, 2009 which is incorporated by reference herein in its entirety.

BACKGROUND

A number of cathode materials for Li-ion batteries are capable of providing very high capacity when charged to voltages greater than the standard 4.2 V vs. lithium metal. For many cathode materials, the higher the charging cut-off voltage, the more lithium that can be removed from the cathode material per unit weight. Unfortunately many cathode materials in these high states of charge can be reactive towards the electrolyte, resulting in surface reactions that can damage the cathode material and consume the electrolyte. This results in accelerated capacity loss and impedance build-up, greatly shortening the life of a Li-ion cell using these materials at such high voltages. Thus it is desirable to provide high voltage capable cathode materials that are stabilized to the electrolyte at high voltages to enable the construction of long life, very high capacity, high voltage Li-ion cells. One approach to improve the stability of these materials is to coat the surface of the active cathode materials with a phase that is more stable to the electrolyte at high voltages.

Some cathode materials have been reported with improved stability to the electrolyte at high voltages (>4.5V). For example, layered type $Li_{1+y}(NiCoMn)O_2$ ($0=<y=<0.3$) materials (for example U.S. Pat. No. 6,677,082 B2) coated or treated with $AlF_3$ have demonstrated improved stability and life at high voltages. However, these coating layers may be insulating and not lithium ion conductive and may negatively affect the performance of the cathode material. Thus a high capacity, long cycle life cathode material that is stabilized at high voltages is highly desirable.

SUMMARY

In an embodiment, the present invention provides a composite for the cathode of a Li-ion battery comprising:
  a base active material represented by $Li_{1+y}(Ni_a$—$Co_b$—$Mn_c$—$Y_d)O_2$ wherein Y is at least one selected from Mg, Zn, Al, Ga, Cu, B, Zr, and Ti, y is 0 to 0.5, a is 0.1 to 0.6, b is 0.05 to 0.5, c is 0.25 to 0.8, d is 0 to 0.02, and the sum of a, b, c and d is 1; and
  a coating on the base active material comprised of a glassy phase containing the components $Li_2O$, $B_2O_3$ and LiX in which LiX is at least one of $Li_2F_2$, $Li_2Cl_2$ and $Li_2SO_4$, relative to the total amount of the glassy phase, the mole percent of $Li_2O$ is 43% to 75%, the mole percent of $B_2O_3$ is 25% to 57%, the mole percent of LiX is from more than 0% to 20%, and the sum of the mole percents of $Li_2O$, $B_2O_3$ and LiX is 100%.

Relative to the total amount of the composite, the content of the base active material may be 90 wt % to 99.9 wt %, preferably 94 wt % to 99 wt %, and more preferably 97 wt % to 98 wt %, and the content of the coating is 0.1 wt % to 10 wt %, preferably 1 wt % to 6 wt %, and more preferably 2 wt % to 3 wt %.

Preferably, relative to the total amount of the glassy phase, the mole percent of $Li_2O$ is 55% to 65%, the mole percent of $B_2O_3$ is 25% to 35%, and the mole percent of LiX is 5% to 15%.

In an embodiment, the present invention provides a method for making the composite of the present invention including the steps of:
(1) mixing the base active material with the glassy phase components and/or a precursor for the glassy phase components; and
(2) firing the mixture obtained in step (1).

In step (1) the mixing may be dry mixing.

In step (1) the mixing may be performed in a solvent which may be selected from water, acetone, and methanol.

In step (1) the precursor for $Li_2O$ may be at least one of LiOH, $Li_2B_4O_7$, $Li_2CO_3$, and $LiHCO_3$, and the precursor for $B_2O_3$ may be at least one of $Li_2B_4O_7$, $LiBO_2$, $H_3BO_3$, and $HBO_2$.

In step (2) the firing may be performed at a temperature of 300° C. to 900° C. for 10 min to 2 hours.

In an embodiment, the present invention provides a Li-ion battery comprising a cathode, an anode and a separator sandwiched there between wherein the cathode contains the composite of the present invention. Except that the composite of the present invention is used as cathode active material, the battery of the present invention may be prepared according to the conventional process in this art.

DETAILED DESCRIPTION

Figure 1:
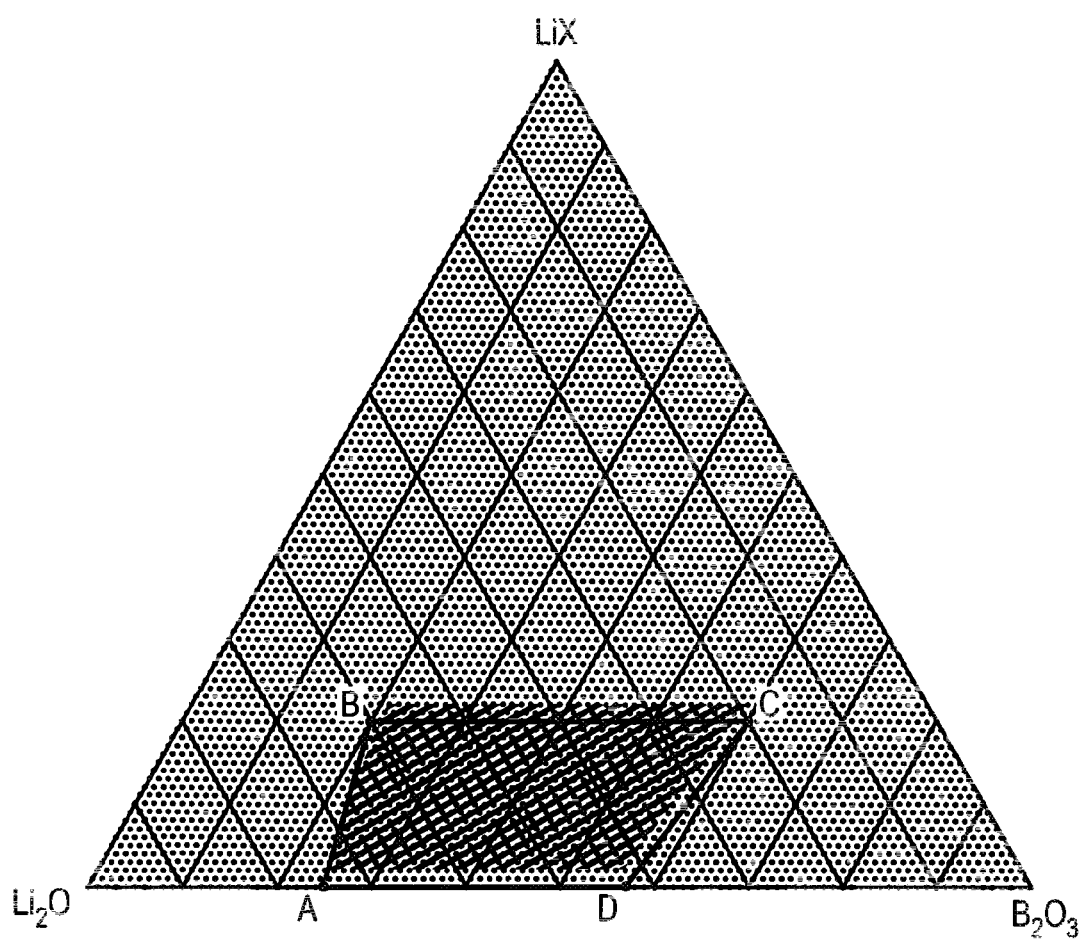
FIG. 1 shows a ternary molar composition diagram with the useful region of lithia rich glassy compositions for coating the active layered materials indicated in the shaded region (ABCD).

The material of this invention is a cathode material for Li-ion cells comprising a core of a layered $Li_{1+y}(Ni_a$—$Co_b$—$Mn_c$—$Y_d)O_2$ material with a surface coating of a lithia rich glassy composition. The core of the material of this invention may also be described as a cathode material in its initial discharged state. The coated material of this invention exhibits high capacity and high stability at voltages greater than 4.2V vs lithium. In one aspect of this invention the stabilizing coating is a vitreous, ion-conductive layer. In another aspect of this invention the coating exists in various stages of devitrification.

In another aspect of this invention, a method of preparing the material is provided wherein the core material is supplied as a powder and dry-mixed in the proper molar ratio with the components of the coating phase. The coating phase components or their precursors are added in the proper molar ratios to obtain a final coating composition within the coating compositional range of this invention at a total amount that is not more than 10 wt % of the core material. The mixture is fired at temperatures above 300° C. for 10 min to 2 hours. In another aspect of this invention a method of preparing the material is provided wherein the core material is supplied as a powder and wet mixed using a solvent such as water or acetone with the components of the coating phase or their precursors. The mixture is dried and then fired above 300° C. for 10 min to 2 hours. The coating phase may also be formed by rapidly cooling the mixture from the firing temperature. The material of this invention may be used in Li-ion batteries as the cathode.

The specific advantages of this material over the current art include the fact that the coating phase is insulating and stable to the electrolyte at high voltages and may minimize adverse reactions of the cathode material with the electrolyte at high voltages; it is Li-ion conductive and may minimize the impact of the coating layer on the material performance; it may be a vitreous phase allowing for more uniform coating of the particles surface, and these compositions are chemically compatible with the active cathode material such that firing the materials together to make the coating layer does not adversely affect the structure or performance of the base active material. These unique combination of characteristics lead to greatly improved stability of the layered type cathode materials of this invention at high voltages allowing for extended cycle life at high capacities.

It has been discovered and demonstrated that certain lithium salts, notably lithium fluoride, lithium chloride and lithium sulfate may further favorably extend the glass-forming limits of the lithium oxide/boric oxide binary system. The higher Lithia ratio leads to greater ion conductivity compared to previous known glass phases in this system. We have found that coatings made from these lithia rich, highly stable, ion conductive glass phase compositions result in enhanced stability at high voltages for the class of materials described generally by the formula $Li_{1+y}(Ni_a-Co_b-Mn_c-Y_d)O_2$ and in detail for example in U.S. Pat. No. 6,677,082 B2.

FIG. 1 shows a ternary molar composition diagram with the useful region of lithia rich glassy compositions for coating the active layered materials indicated in the shaded region (ABCD). The present inventors have found that lithia rich glassy compositions within this range, where A is 0.75 lithium oxide/0.25 boric oxide, B is 0.6 lithium oxide/0.2 boric oxide/0.2 LiX, C being 0.2 lithium oxide/0.6 boric oxide/0.2 LiX, and D is 0.43 lithium oxide/0.57 boric oxide, are highly compatible with the layered $Li_{1+y}(Ni_a-Co_b-Mn_c-Y_d)O_2$ type cathode materials and as protective coatings result in greater stability, longer cycle life and higher capacity cathode materials. Some of the coating compositions toward the lithia rich end of the glassy range possess room temperature lithium ionic conductance in excess of $1E^{-6}$ Siemens. Furthermore, many of these glass compositions were observed to be un-effected by molten lithium. Further stability, ionic conductivity or other desirable features may be imparted into these coating phases by addition of materials such as $Li_2MoO_4$, $Li_2WO_4$, $Li_2CO_3$ and $Li_3AlF_6$ up to ~3 mass percent.

BEST MODE

Examples

Comparative Example 1

Untreated Cathode Material $Li_{1.05}(Ni_{1/3}Co_{1/3}Mn_{1/3})O_2$

The layered cathode material $Li_{1.05}(Ni_{1/3}Co_{1/3}Mn_{1/3})O_2$, was weighed out to prepare an electrode of the cathode material, acetylene black, graphite and Polyvinylidene difluoride binder in the formulation of 83%/7%/5%/5%. The electrode was then evaluated using a Size 2032 coin cell. The cells had the configuration: Li/1M $LiPF_6$ in 1:1 ethylene carbonate:diethyl carbonate/cathode material.

Comparative Example 2

Two Component Lithium-Ion Conducting Glass Coated $Li_{1.05}(Ni_{1/3}Co_{1/3}Mn_{1/3})O_2$ Two component lithium-ion conducting glass composition of $Li_2O-B_2O_3$, was used to coat on the surface of same base layered cathode material with 2% by weight of mixture of $Li_2B_4O_7$ and $B_2O_3$ following a molar ratio of 1:2, which gives a $Li_2O-B_2O_3$ molar ratio of 1:4 in the final composite cathode materials. To prepare the glass coated $Li_{1.05}(Ni_{1/3}Co_{1/3}Mn_{1/3})O_2$ cathode material, 50 g of the base layered cathode material was weighed out, put into a container. 0.5484 g of $Li_2B_4O_7$ and 0.4516 g of $B_2O_3$ were then weighed out and added to the same container, then mixed using roll-miller with ceramic balls for 12 hrs. The mixture was then fired in air at 850° C. for 1 hour.

Example 1

2% Glass Composition of $Li_2O-B_2O_3-Li_2F_2$ Coated $Li_{1.05}(Ni_{1/3}Co_{1/3}Mn_{1/3})O_2$ The same $Li_{1.05}(Ni_{1/3}Co_{1/3}Mn_{1/3})O_2$ powder used in the Comparative Examples was used as the base layered cathode material in this example of the method of this invention. The solid-state coating method was used to treat the base material as follows to produce a final composite material containing approximately 2% by weight, glass composition of $Li_2O-B_2O_3-Li_2F_2$ in a molar ratio of 3.2:1.8:0.5. 1.72 g of LiOH, and 2.38 g of $Li_2B_4O_7$, 0.41 g of LiF, and 225 g of the base $Li_{1.05}(Ni_{1/3}Co_{1/3}Mn_{1/3})O_2$ cathode material were weighed out and placed into a sealed roll mill container with ceramic balls. The container and its contents were roll-milled for 12 hrs with WHEATON Modular Cell Production Roller Apparatus, Model III. The mixtures were then divided into three parts, and fired in air using a Lindberg/blue BM 51828C Furnace by the following process: Heating: 5° C./min, to the target temperatures of 350° C., holding for 0.5 hours (Ex. 1-a), 500° C. for 0.5 hours (Ex. 1-b), and 850° C. for 0.5 hours (Ex. 1-c), respectively. This produces three composite materials with 2% by weight glass composition of $Li_2O-B_2O_3-Li_2F_2$ coating (see Table 1 below). The final products were sieved using an Octagon 200 Test Sieve Shaker with Standard Test Sieve to remove large particles prior to coating the electrodes.

TABLE 1

2% Glass Composition of $Li_2O$—$B_2O_3$—$Li_2F_2$
Coated $Li_{1.05}(Ni_{1/3}Co_{1/3}Mn_{1/3})O_2$

| Example | Base Material Wt, g | Coating Wt % | Firing Conditions |
|---|---|---|---|
| Example 1-a | 75 | 2% | 350° C., 0.5 hr |
| Example 1-b | 75 | 2% | 500° C., 0.5 hr |
| Example 1-c | 75 | 2% | 850° C., 0.5 hr |

Example 2

5% Glass Composition of $Li_2O$—$B_2O_3$—$Li_2F_2$
Coated $Li_{1.05}(Ni_{1/3}Co_{1/3}Mn_{1/3})O_2$ The same $Li_{1.05}(Ni_{1/3}Co_{1/3}Mn_{1/3})O_2$ powder used in the Comparative Examples was used as the base layered cathode material in this example of the method of this invention. The solid-state coating method was used to treat the base material as follows to produce a final composite material containing approximately 5% by weight, glass composition of $Li_2O$—$B_2O_3$—$Li_2F_2$ in a molar ratio of 3.2:1.8:0.5. 4.30 g of LiOH, and 5.94 g of $Li_2B_4O_7$, 1.02 g of LiF, and 225 g of the base $Li_{1.05}(Ni_{1/3}Co_{1/3}Mn_{1/3})O_2$ cathode material were weighed out and placed into a sealed roll mill container with ceramic balls. The container and its contents were roll-milled for 12 hrs with WHEATON Modular Cell Production Roller Apparatus, Model III. The mixtures were then divided into three parts, and fired in air using a Lindberg/blue BM 51828C Furnace by the following process: Heating: 5° C./min, to the target temperature of 350° C., holding for 0.5 hours (Ex. 2-a), 500° C. for 0.5 hours (Ex. 2-b), and 850° C. for 0.5 hours (Ex. 2-c), respectively; Cooling: 5° C./min, to ~20° C. This produces three composite materials with 5% by weight glass composition of $Li_2O$—$B_2O_3$—$Li_2F_2$ coating (see Table 2 below). The final products were sieved using an Octagon 200 Test Sieve Shaker with Standard Test Sieve to remove large particles prior to coating the electrodes.

TABLE 2

5% Glass Composition of $Li_2O$—$B_2O_3$—$Li_2F_2$
Coated $Li_{1.05}(Ni_{1/3}Co_{1/3}Mn_{1/3})O_2$

| Example | Base Material Wt, g | Coating Wt % | Firing Conditions |
|---|---|---|---|
| Example 2-a | 75 | 5% | 350° C., 0.5 hr |
| Example 2-b | 75 | 5% | 500° C., 0.5 hr |
| Example 2-c | 75 | 5% | 850° C., 0.5 hr |

Example 3

2% Glass Composition of $Li_2O$—$B_2O_3$—$Li_2SO_4$
Coated $Li_{1.05}(Ni_{1/3}Co_{1/3}Mn_{1/3})O_2$ The same $Li_{1.05}(Ni_{1/3}Co_{1/3}Mn_{1/3})O_2$ powder used in Comparative Examples was used as the base layered cathode material in this example of the method of this invention. The solid-state coating method used in this Example was the same as that for Example 1 and Example 2, except using $Li_2SO_4$ to replace $Li_2F_2$. 0.2485 g of $Li_2SO_4$, 0.4330 g of LiOH, and 0.3185 g of $Li_2B_4O_7$, and 50 g of the base $Li_{1.05}(Ni_{1/3}Co_{1/3}Mn_{1/3})O_2$ cathode material were weighed out and placed into a sealed roll mill container with ceramic balls. The container and its contents were roll-milled for 12 hrs with WHEATON Modular Cell Production Roller Apparatus, Model III. The mixtures were then fired in air using a Lindberg/blue BM 51828C Furnace at 5° C./min to the target temperatures of 850° C., holding for 1 hour. This produces a final composite material containing approximately 2% by weight, glass composition of $Li_2O$—$B_2O_3$—$Li_2SO_4$ in a molar ratio of 0.6:0.25:0.15. The final product was sieved using an Octagon 200 Test Sieve Shaker with Standard Test Sieve to remove large particles prior to coating the electrodes Example 4

Figure 2:
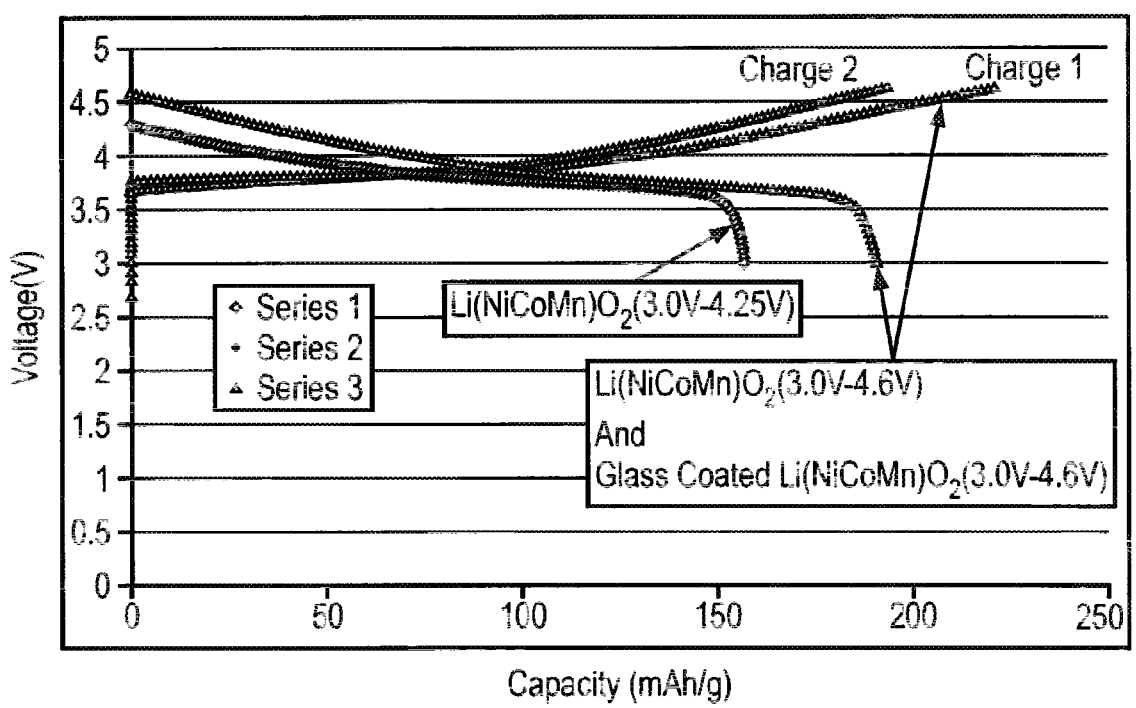
FIG. 2 compares the charge and discharge voltage profiles of the cells prepared from uncoated base cathode material and the coated material.
Figure 3:
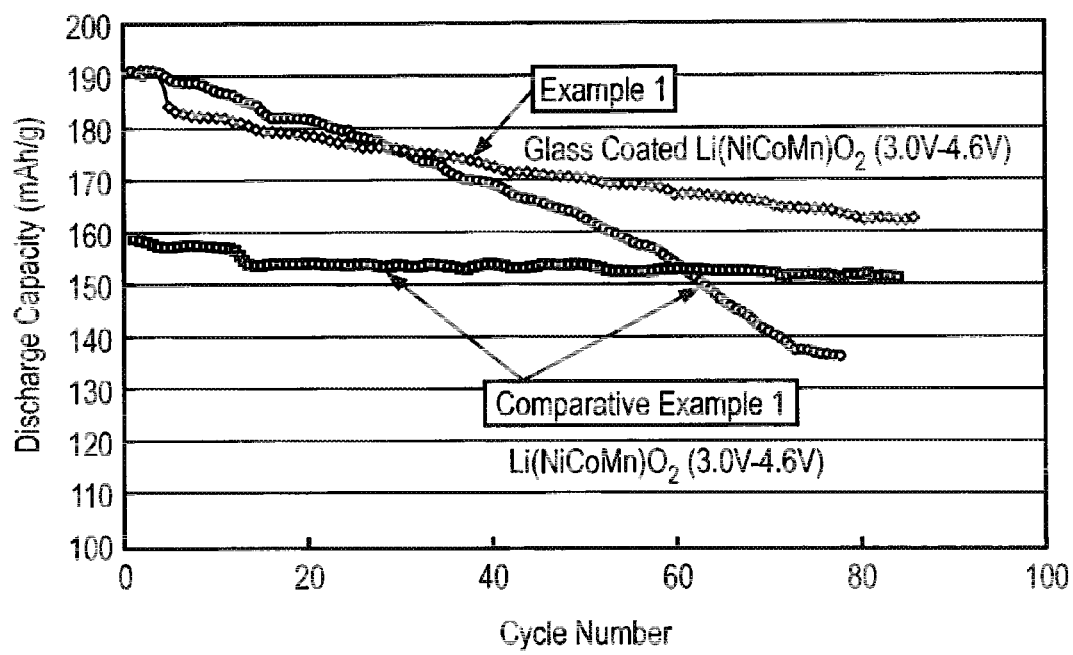
FIG. 3 shows specific capacity vs cycle number plots for the cells prepared from uncoated base cathode material and the coated material.
Figure 4:
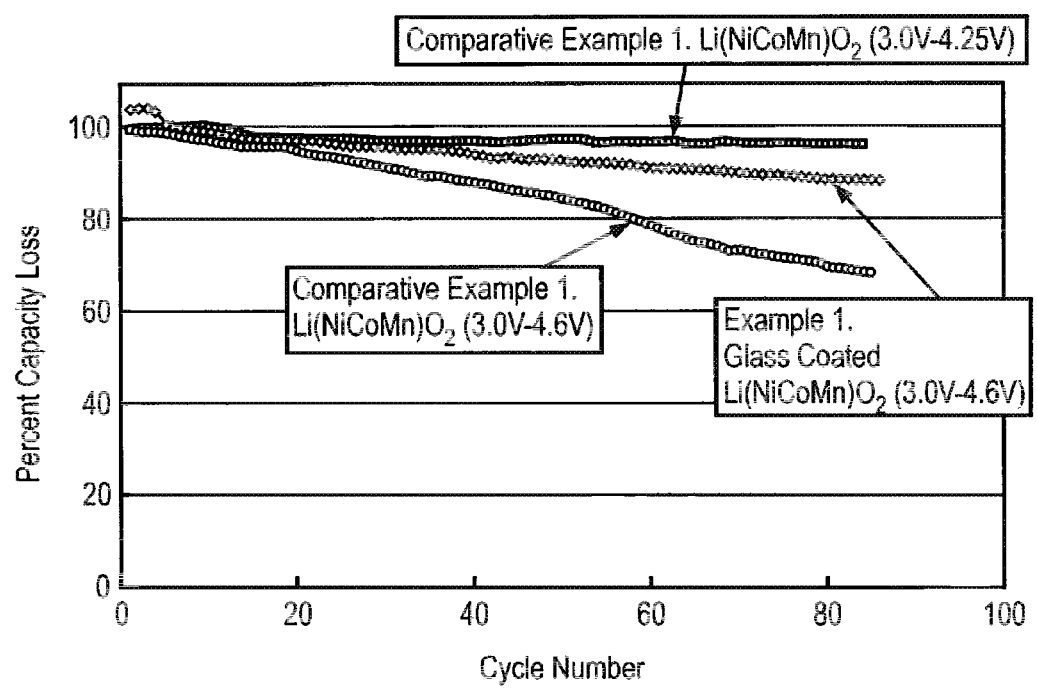
FIG. 4 shows a plot of the % capacity loss vs cycle number for the cells prepared from uncoated base cathode material and the coated material.

5% Glass Composition of $Li_2O$—$B_2O_3$—$Li_2SO_4$
Coated $Li_{1.05}(Ni_{1/3}Co_{1/3}Mn_{1/3})O_2$ The solid-state coating method used in this Example was the same as that for Example 3, except coating weight percentage changed to 5%. 0.6213 g of $Li_2SO_4$, 1.0825 g of LiOH, and 0.7963 g of $Li_2B_4O_7$, and 50 g of the base $Li_{1.05}(Ni_{1/3}Co_{1/3}Mn_{1/3})O_2$ cathode material were weighed out and placed into a sealed roll mill container with ceramic balls. The container and its contents were roll-milled for 12 hrs with WHEATON Modular Cell Production Roller Apparatus, Model III. The mixtures were then fired in air using a Lindberg/blue BM 51828C Furnace at 5° C./min to the target temperatures of 850° C., holding for 1 hour. This produces a final composite material containing approximately 5% by weight, glass composition of $Li_2O$—$B_2O_3$—$Li_2SO_4$ in a molar ratio of 0.6:0.25:0.15. The final product was sieved using an Octagon 200 Test Sieve Shaker with Standard Test Sieve to remove large particles prior to coating the electrodes Electrodes were prepared with the cathode samples by making a slurry in NMP containing approximately 85% active material, 6% conductive additives and 9% PVDF binder. The slurry was coated onto an Al foil current collector. Lithium metal coin cells were built using the electrodes and testing using a galvanostatic cycler. FIG. 2 compares the charge and discharge voltage profiles of the uncoated base cathode material of comparative example 1 and the 2% coated material of Example 1-a. The uncoated base material was cycled between 3.0 and 4.25 V to achieve a discharge capacity of ~155 mAh/g. In comparaison, when cycled to 4.6 V the reversible capacity of the uncoated base material increased to almost 200 mAh/g. The 2% coated material, of example 1-a has an almost identical voltage curve and similar capacity to the uncoated base material, comparative example 1, also when cycled to 4.6V. FIG. 3 shows specific capacity vs cycle number plots for the same cells. To accelerate the capacity fade associated with the stability of the cathode material to the electrolyte at high voltages the cells were charged to their upper voltage and held at the upper voltage for 5 hours before the subsequent discharge was started. The initial capacity of the coated and uncoated samples is similar but the coated sample, (example 1-a) shows a much lower capacity fade rate relative to the uncoated sample when both are cycled to 4.6 V vs. lithium. FIG. 4 shows a plot of the % capacity loss vs cycle number for the same cells.

Figure 5:
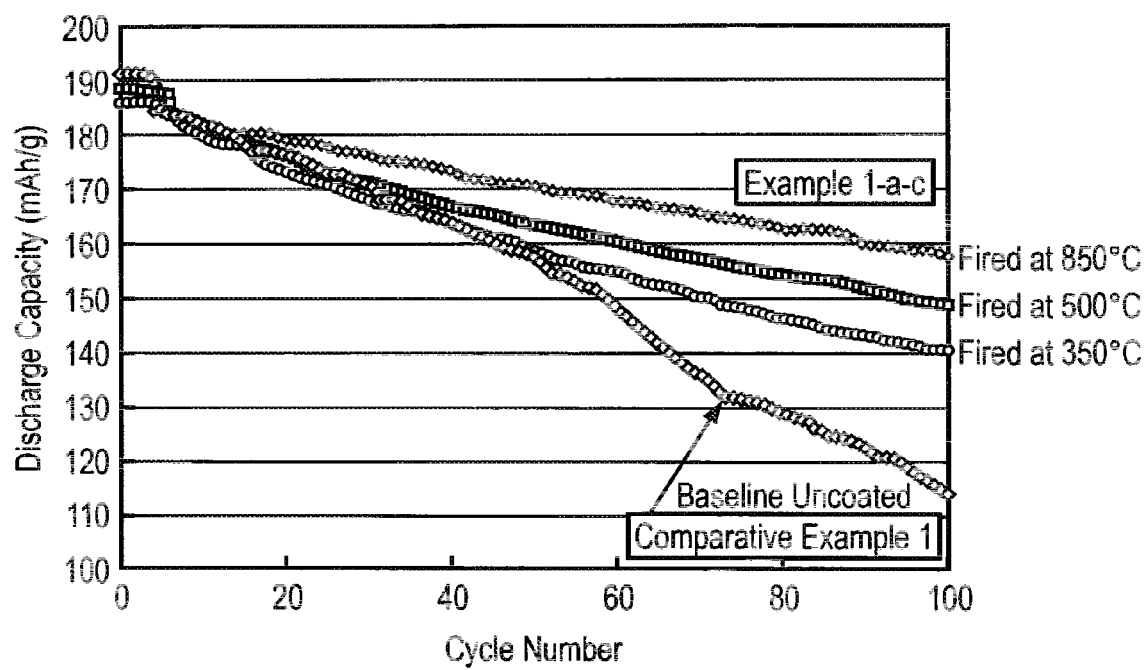
FIG. 5 shows the effect of firing temperature on the capacity loss vs. cycle number for a series of 2% glass coated cathode materials.

FIG. 5 shows the capacity vs cycle number data for a series of coin cells made using cathode materials of Examples 1a-c that were fired at different temperatures. The cells were cycled with an upper voltage limit of 4.6V and held at that voltage for 5 hours for each cycle. The first 5 cycles were completed at a C/10 rate and the subsequent cycles were done at a C/5 rate. The higher firing temperature of 850 C provides the greatest capacity and capacity retention and all the coated materials provided greater capacity retention than the base uncoated material.

Figure 6:
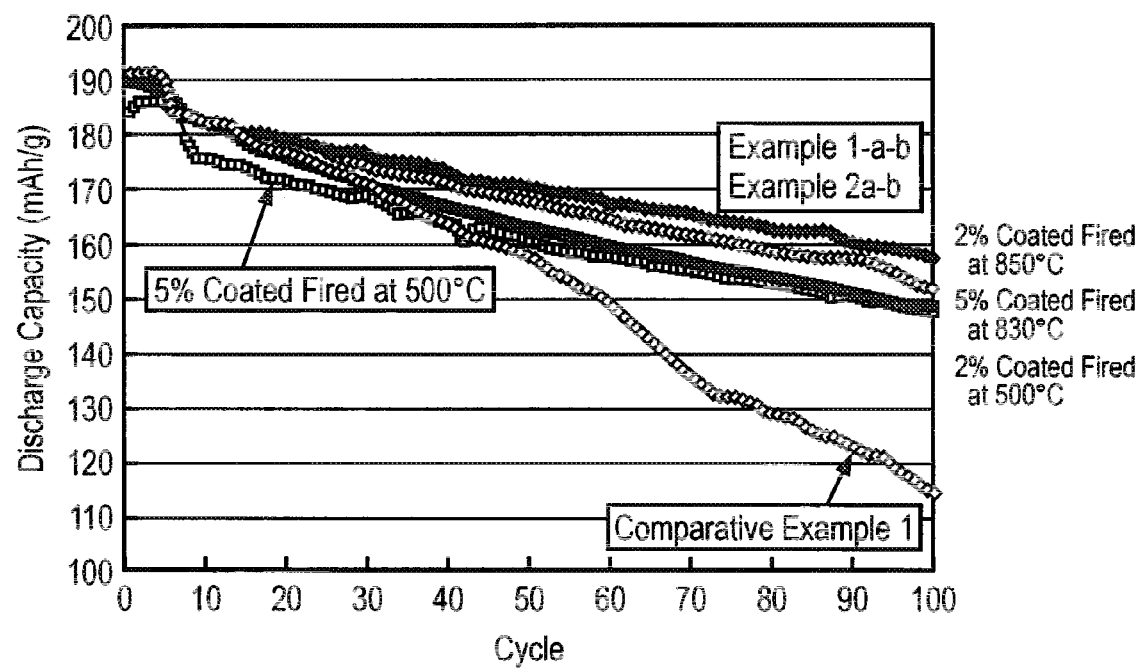
FIG. 6 shows the effect of coating amount on the capacity loss vs. cycle number for a series of glass coated cathode materials.

FIG. 6 shows the capacity vs. cycle number plot for a series of coin cells made using cathode materials from Examples 1 and 2 illustrating the impact of coating amount on the material specific capacity and capacity retention. The lower coating amount of 2% generally provided greater capacity with the same cycling stability as the higher 5% coating amount.

Figure 7:
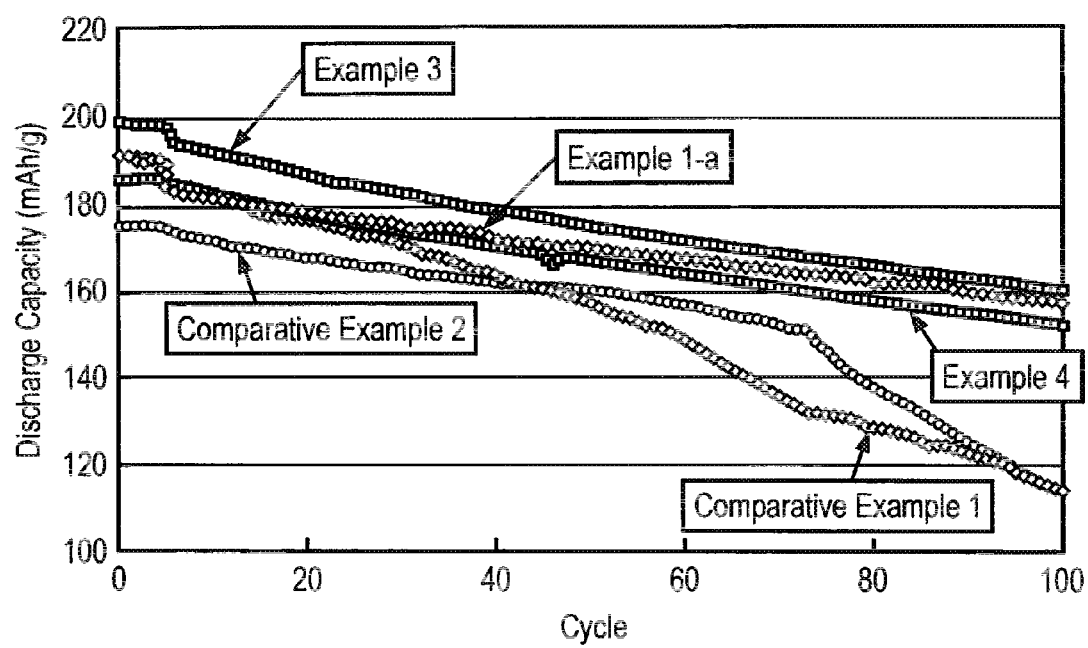
FIG. 7 shows the effect of the composition of the glass coating vs comparative examples on the capacity loss vs cycle number.

FIG. 7 shows a comparison of the cycling capacity vs. cycle number for different compositions of the coating phase from examples 3 and 4. The phase containing $Li_2SO_4$ shows good capacity retention and cycling stability. The comparative example 2 that does not contain an additional salt selected from LiF, LiCl or $Li_2SO_4$ exhibited poor low capacity and high impedance.

Thus the material of this invention provides for a cathode for Li-ion batteries with greater capacity and greater cycle life than the existing material.

What is claimed is:

1. A composite for the cathode of Li-ion battery comprising:
   a base active material represented by $Li_{1+y}(Ni_a-Co_b-Mn_c-Y_d)O_2$ wherein Y is at least one selected from Mg, Zn, Al, Ga, Cu, B, Zr, and Ti, y is 0 to 0.5, a is 0.1 to 0.6, b is 0.05 to 0.5, c is 0.25 to 0.8, d is 0 to 0.02, and the sum of a, b, c and d is 1; and
   a coating on the base active material comprised of a glassy phase containing the components $Li_2O$, $B_2O_3$ and LiX in which LiX is at least one of $Li_2F_2$, $Li_2Cl_2$ and $Li_2SO_4$, relative to the total amount of the glassy phase, the mole percent of $Li_2O$ is 43% to 75%, the mole percent of $B_2O_3$ is 25% to 57%, the mole percent of LiX is from more than 0% to 20%, and the sum of the mole percents of $Li_2O$, $B_2O_3$ and LiX is 100%.

2. The composite of claim 1 wherein relative to the total amount of the composite, the content of the base active material is 90 wt % to 99.9 wt %, and the content of the coating is 0.1 wt % to 10 wt %.

3. The composite of claim 2 wherein relative to the total amount of the composite, the content of the base active material is 94 wt % to 99 wt %, and the content of the coating is 1 wt % to 6 wt %.

4. The composite of claim 1 wherein relative to the total amount of the glassy phase, the mole percent of $Li_2O$ is 55% to 65%, the mole percent of $B_2O_3$ is 25% to 35%, and the mole percent of LiX is 5% to 15%.

5. A method for making the composite of claim 1 comprising:
   (1) mixing the base active material with the glassy phase components and/or a precursor for the glassy phase components; and
   (2) firing the mixture obtained in (1).

6. The method of claim 5 wherein in (1) the mixing is dry mixing.

7. The method of claim 5 wherein in (1) the mixing is performed in a solvent selected from water, acetone, and methanol.

8. The method of claim 5 wherein in (1) the precursor for $Li_2O$ is at least one of LiOH, $Li_2B_4O_7$, $Li_2CO_3$, and $LiHCO_3$, and the precursor for $B_2O_3$ is at least one of $Li_2B_4O_7$, $LiBO_2$, $H_3BO_3$, and $HBO_2$.

9. The method of claim 5 wherein in (2) the firing is performed at a temperature of 300° C. to 900° C. for 10 min to 2 hours.

10. A Li-ion battery comprising a cathode, an anode and a separator sandwiched there between wherein the cathode comprises a composite comprising:
   a base active material represented by $Li_{1-y}(Ni_a-Co_b-Mn_c-Y_d)O_2$ wherein Y is at least one selected from Mg, Zn, Al, Ga, Cu, B, Zr, and Ti, y is 0 to 0.5, a is 0.1 to 0.6, b is 0.05 to 0.5, c is 0.25 to 0.8, d is 0 to 0.02, and the sum of a, b, c and d is 1; and
   a coating on the base active material comprised of a glassy phase containing the components $Li_2O$, $B_2O_3$ and LiX in which LiX is at least one of $Li_2F_2$, $Li_2Cl_2$ and $Li_2SO_4$, relative to the total amount of the glassy phase, the mole percent of $Li_2O$ is 43% to 75%, the mole percent of $B_2O_3$ is 25% to 57%, the mole percent of LiX is from more than 0% to 20%, and the sum of the mole percents of $Li_2O$, $B_2O_3$ and LiX is 100%.

* * * * *